(12) United States Patent
Matsuzaki et al.

(10) Patent No.: US 10,770,746 B2
(45) Date of Patent: Sep. 8, 2020

(54) METHOD FOR PRODUCING A LITHIUM ION SECONDARY BATTERY

(71) Applicant: Envision AESC Japan Ltd., Kanagawa (JP)

(72) Inventors: Ikuma Matsuzaki, Kanagawa (JP); Kazuki Miyatake, Kanagawa (JP); Keisuke Matsumoto, Kanagawa (JP); Kodai Nagano, Kanagawa (JP)

(73) Assignee: Envision AESC Japan Ltd., Kanagawa (JP)

(*) Notice: Subject to any disclaimer, the term of this patent is extended or adjusted under 35 U.S.C. 154(b) by 0 days.

(21) Appl. No.: 15/544,623

(22) PCT Filed: Mar. 19, 2015

(86) PCT No.: PCT/JP2015/058363
§ 371 (c)(1),
(2) Date: Jul. 19, 2017

(87) PCT Pub. No.: WO2016/147409
PCT Pub. Date: Sep. 22, 2016

(65) Prior Publication Data
US 2018/0040911 A1     Feb. 8, 2018

(51) Int. Cl.
*H01M 10/058* (2010.01)
*H01M 10/052* (2010.01)
*H01M 2/16* (2006.01)

(52) U.S. Cl.
CPC ........... *H01M 10/052* (2013.01); *H01M 2/16* (2013.01); *H01M 2/1686* (2013.01); *H01M 10/058* (2013.01)

(58) Field of Classification Search
None
See application file for complete search history.

(56) References Cited

U.S. PATENT DOCUMENTS

2014/0147726 A1* 5/2014 Toyoda ................. C08F 220/12
429/144

FOREIGN PATENT DOCUMENTS

| JP | 2010-232048 A | 10/2010 |
|---|---|---|
| JP | 2012-252969 A | 12/2012 |

(Continued)

OTHER PUBLICATIONS

International Preliminary Report on Patentability issued in corresponding application No. PCT/JP2015/058363 dated Nov. 24, 2015 (16 pages).

*Primary Examiner* — Haixia Zhang
(74) *Attorney, Agent, or Firm* — Osha Liang LLP

(57) ABSTRACT

A method for producing a lithium ion secondary battery in which a positive electrode, a heat-resistant insulating layer provided separator having a heat-resistant insulating layer formed of oxide particles on one surface of a resin porous substrate, and a negative electrode are laminated on one another, and a nonaqueous electrolyte is impregnated in the heat-resistant insulating layer provided separator, includes drying the heat-resistant insulating layer provided separator before laminating so that the water content in the heat-resistant insulating layer provided separator remains in a predetermined range. In the drying, the water content in the heat-resistant insulating layer provided separator is decreased to the predetermined range by controlling the dew point and maintaining the predetermined range after reaching the predetermined range of water content.

3 Claims, 10 Drawing Sheets

(56) References Cited

FOREIGN PATENT DOCUMENTS

| JP | 2014-7038 A | 1/2014 |
| JP | 2014-207059 A | 10/2014 |
| WO | 2007/066768 A1 | 6/2007 |
| WO | 2014/002701 A1 | 1/2014 |

* cited by examiner

METHOD FOR PRODUCING A LITHIUM ION SECONDARY BATTERY

BACKGROUND

Technical Field

The present invention relates to a method for producing a lithium ion secondary battery.

Related Art

A lithium-ion secondary battery has a structure in which a positive electrode and a negative electrode are disposed to face each other through an electrolyte layer formed by a separator holding an electrolytic solution or electrolyte gel.

As the separator, use is often made of a resin porous membrane. However, such resin-made porous film has a possibility that thermal contraction due to increase in the battery internal temperature and a short circuit associated therewith may occur.

Thus, in order to suppress heat shrinkage of the separator, a special separator has been developed that is provided with a heat resistant and insulating layer laminated on one surface of a resin porous membrane (e.g., see Patent Document 1).
Patent Document 1: WO 2007/066768 pamphlet

SUMMARY

However, when a separator as described in Patent Document 1 is applied to a flat plate laminate nonaqueous electrolyte secondary battery, curling occurs in the end portion of the separator during manufacture of the battery so that the separators are laminated with the curled portion folded.

A method for producing a lithium ion secondary battery according to one or more embodiments of the present invention suppresses the occurrence of curl in the heat-resistant insulating layer provided separator.

One or more embodiments of the present invention includes a method for producing a lithium ion secondary battery in which a positive electrode, a heat-resistant insulating layer provided separator having a heat-resistant insulating layer formed of oxide particles on one surface of the resin porous substrate, and a negative electrode are laminated on one another, and a nonaqueous electrolyte is impregnated in the heat-resistant insulating layer provided separator. According to one or more embodiments of the present invention, prior to laminating the positive electrode, the heat-resistant insulating layer provided separator, and the negative electrode, a drying step is provided for drying the heat-resistant insulating layer provided separator so that the amount of water contained or water content in the heat-resistant insulating layer provided separator remains in a predetermined range.

In the drying step, the water content of the heat-resistant insulating layer provided separator is decreased to the predetermined range of water content by controlling the dew point and, after reaching the predetermined range of water content, maintaining the predetermined water content. The shape of the heat-resistant insulating layer provided separator after the drying step is defined by a length ratio Y between the length of the resin porous substrate after drying and that of the heat resistant insulating layer after drying, and the dew point is set so as to attain a water content decrease rate that is configured to satisfy the equation:

$$1-4\pi X \leq Y \leq 1+4\pi X \quad (1)$$

wherein X represents a ratio (D/L) of the thickness D of the separator to the length L of the separator.

According to one or more embodiments of the present invention, in the drying step of drying the heat-resistant insulating layer provided separator, the water content of the heat-insulating layer provided separator is maintained within a predetermined range. Thus, it is possible to suppress the occurrence of curling due to shrinkage of the heat-resistant insulating layer separator. Therefore, it is possible to improve the yield of the lithium ion secondary battery manufactured by laminating the positive electrode, the heat-resistant insulating layer provided separator, and the negative electrode.

DETAILED DESCRIPTION

Figure 1:
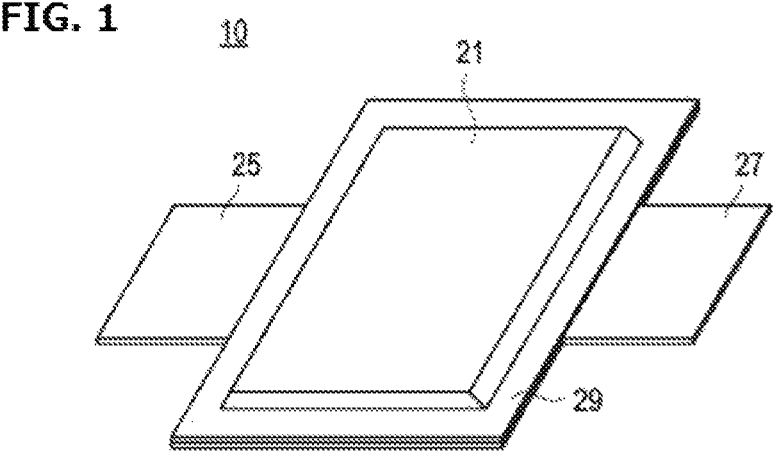
FIG. 1 is a perspective view showing an appearance of a flat lithium ion secondary battery as an example of a secondary battery that may be produced in accordance with one or more embodiments of the present invention.

Below, with reference to the accompanying drawings, a description is given of embodiments of to the present invention. The same reference numerals are given to the same elements in the description of the drawings, without redundant description. Further, dimensional ratios in the drawings are somewhat exaggerated for convenience of explanation, and thus are different from the actual ratios. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Overall Structure of Battery]

FIG. 1 is a perspective view representing the appearance of a flat lithium ion secondary battery as an example of a secondary battery that can be produced according to one or more embodiments of the present invention.

As shown in FIG. 1, the flat lithium ion secondary battery 10 has a rectangular flat shape. A positive electrode tab 27 and a negative electrode tab 25 for drawing electric power are pulled out from both sides thereof, as illustrated in FIG. 1.

A power generating element 21 is clad or enveloped by a battery external material 29 of the lithium ion secondary battery 10 with the periphery thereof being thermally fused. The power generating element 21 is sealed in a state with the positive electrode tab 27 and the negative electrode tab 25 being pulled out to the outside.

Pulling-out position of the electrode tabs are not particularly limited in the manner shown in FIG. 1. The tabs may be pulled out of the positive electrode and negative electrode may be pulled out from the same side. Also, the positive electrode tab 27 and the negative electrode tab 25 may be divided into a plurality of tables, and allocated to each side so as to be pulled out, respectively. Thus, the manner of pulling-out is not limited to that shown in FIG. 1.

In such a lithium ion secondary battery 10, for example, the ratio of battery area (area of the whole battery including the external material) to rated capacity is 5 cm$^2$/Ah or more, and the rated capacity is 3 Ah more.

Figure 2:
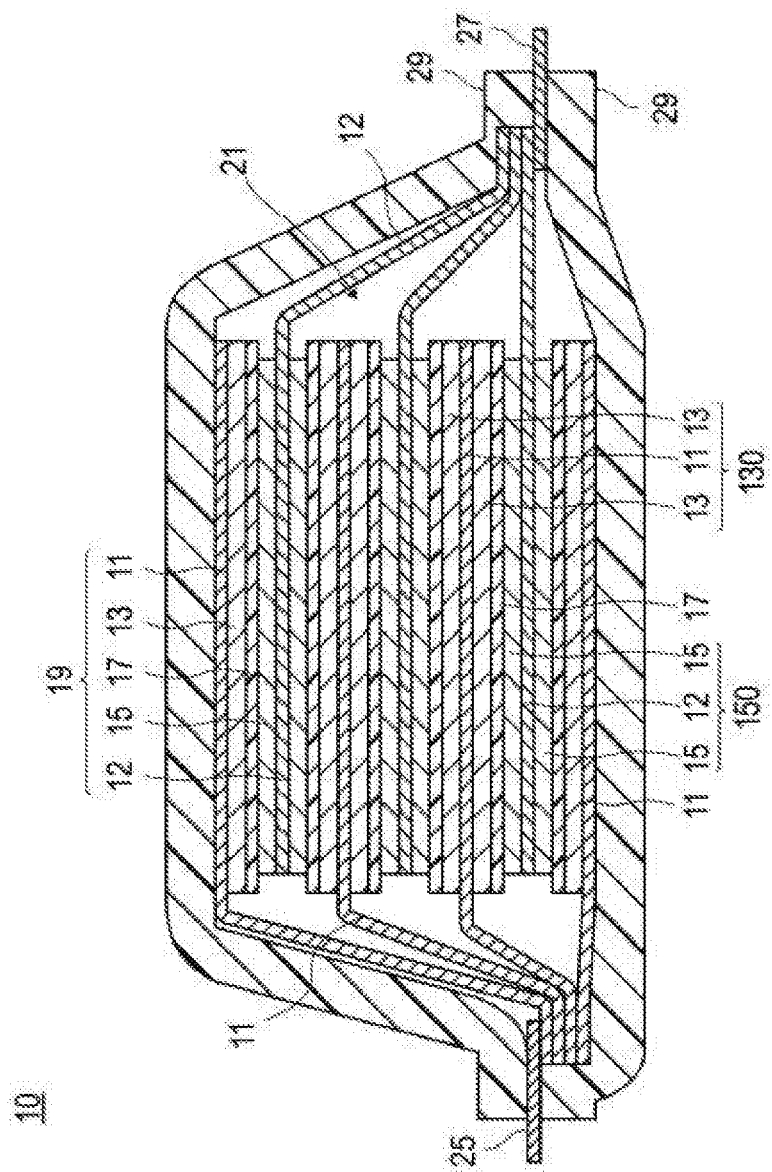
FIG. 2 is a schematic sectional view showing an internal structure of a lithium ion secondary battery.

FIG. 2 is a schematic cross-sectional view illustrating the internal structure of the lithium ion secondary battery.

As shown in FIG. 2, the laminated lithium ion secondary battery 10 according to one or more embodiments of the present invention comprises a structure in which a substantially rectangular power generating element 21, in which a charge and discharge reaction progresses, is sealed inside a battery exterior material 29 comprising an outer package. Here, the power generating element 21 comprises a structure in which a positive electrode 150, a separator 17, and a negative electrode layer 130 are laminated or stacked.

Note that the separator 17 incorporates a non-aqueous electrolyte (for example, a liquid electrolyte). The positive electrode 150 comprises a structure in which positive electrode active material layers 15 are disposed on both sides of the positive electrode current collector 12. The negative electrode 130 comprises a structure in which negative electrode active material layers 13 are disposed on both sides of the negative electrode current collector 11.

The separator 17 in one or more embodiments of the present invention is formed in such a separator provided with a heat-resistant insulating layer on one surface of the resin porous substrate (simply referred to as separator 17 here).

In the laminate or stacked structure, the negative electrode 130 (negative current collector 11 plus negative active material layer 13), the separator 17 (containing nonaqueous electrolyte solution as electrolyte) and the positive electrode 150 (positive current collector 12 and positive active material layer 15) are laminated in this order. Thus, a unit cell layer 19 is constituted by the negative electrode 130, the separator 17, and the positive electrode 150.

The lithium ion secondary battery 10 illustrated in FIG. 1 shows six single unit cell layers 19 are laminated. Needless to say, the actual battery is not limited to such a specific number of layers. Thus, each single cell comprises a structure in which each unit cell is configured to be connected in parallel.

The positive electrode current collector 12 and the negative electrode current collector 11 comprise a structure in which a positive electrode collector plate (tab) 27 and a negative electrode collector plate (tab) 25 are respectively attached to each electrode (positive electrode and negative electrode), and led to the outside of the battery exterior material 29 by being sandwiched by the ends of the battery exterior material 29. The positive electrode collector plate 27 and the negative electrode collector plate 25 may be respectively attached to the positive electrode current collector 12 and the negative electrode current collector 11 of the associated electrode via a positive electrode lead and a negative electrode lead (not shown), if necessary, by ultrasonic welding or resistance welding.

[Positive Electrode Active Material Layer]

The positive electrode active material layer 15 comprises a positive electrode active material. Any positive electrode active material is generally acceptable as long as used in a lithium ion secondary battery 10. For example, lithium-transition metal complex oxides including LiMn2O4, LiCoO2, LiNiO2, Li(Ni—Co—Mn)O2, and those in which a portion of these transition metals is replaced by another element may be used. Also, lithium-transition metal phosphate compounds, lithium transition metal sulfate compounds are acceptable. When necessary, two or more of the positive electrode active materials may be used. According to one or more embodiments of the present invention, in view of capacity and output characteristics, lithium-transition metal complex oxides are used as the positive electrode active material. Note that, needless to say, as a positive electrode active material, the materials other than the above may be used.

In addition, the positive electrode active material layer 15 may comprise additives such as surface active surfactants, conductive assistants, binders, electrolytes (polymer matrix, ion-conduction polymers, electrolytic solutions), and lithium salts to enhance ion conductivity, when necessary. These additives may as well used as long as available for a known lithium ion secondary battery 10.

[Negative Electrode Active Material Layer]

The negative electrode active material 13 includes a negative electrode active material. Such negative electrode active material is generally acceptable as long as used in a lithium ion secondary battery 10. For example, carbon materials such as graphite (graphite), soft carbon, hard carbon, a lithium-transition metal composite oxide (e.g., Li$_4$Ti$_5$O$_{12}$), a metal material, and lithium alloy-based negative electrode materials may be listed. Two or more kinds of negative electrode active materials may be used in combination. According to one or more embodiments of the present invention, capacitance, from the viewpoint of capacity and output characteristics, a carbon material or a lithium-transition metal composite oxide is used as the negative electrode active material. Incidentally, it is needless to say that the negative electrode active material other than the above may be used as well.

The negative electrode active material layer 13 may optionally include, as an additive, such as surfactant, a conductive additive, a binder, an electrolyte (polymer matrix, ion-conducting polymer, such as an electrolytic solution), and lithium salt for improving ion conductivity.

These additives may as well used as long as available for a conventional lithium ion secondary battery 10

[Electrolyte Layer]

The electrolyte layer in one or more embodiments of the present invention has a structure in which electrolyte is impregnated in a separator 17.

[Separator 17]

The separator 17 functions to hold the electrolyte and secure lithium ion conductivity between the positive electrode 150 and the negative electrode 130 as well as a partition wall between the positive electrode 150 and the negative electrode 130. The separator 17 is formed in a heat-resistant insulating layer provided separator having a heat-resistant insulating layer on one surface of a resin porous substrate. Details of the separator 17 itself will be described below.

(Electrolytes)

The electrolytes to be infiltrated or impregnated in the separator are not particularly limited as long as nonaqueous electrolyte is employed such as used in a lithium ion secondary battery 10.

For example, a liquid electrolyte can be used. The electrolyte layer has a form in which lithium salt, which is a supporting salt, is dissolved in an organic solvent. Examples of organic solvents that are used include carbonates such as ethylene carbonates (EC), propylene carbonates (PC), dimethyl carbonate (DMC), diethyl carbonates (DEC), and ethyl methyl carbonates, etc. Two or more types may be used as a mixture. In addition, compounds that can be added to the active material layer of electrodes such as Li(CF3SO2)2N, Li(C2F5SO2)2N, LiPF6, LiBF4, LiClO4, LiAsF6, and LiTaF6, LiCF3SO3 may be employed as the lithium salt as well.

[Current Collector]

While the materials that constitute the current collector are not particularly limited, metal is used according to one or more embodiments of the present invention.

Specific examples of metals include aluminum, nickel, iron, stainless steel, titanium, copper, and other alloys.

In addition, a clad material of these metals, or a plating material may be used according to one or more embodiments of the present invention.

Also with respect to current collector, the material is not particularly limited as long as it is used in a lithium ion secondary battery 10.

Moreover, the positive electrode lead and negative electrode lead are not particularly limited and also made of similar metal that is used for the collector.

[Battery Exterior Body]

As the battery case body 29, a laminate film comprising aluminum may be used. Example of the laminate film may be comprised of a three-layer structure formed by laminating polypropylene, aluminum, and nylon (registered trademark) in this order. It not particularly limited as long as it is used in other lithium-ion secondary battery 10. A known metal can case may be also used.

[Separator]

A description is now given of the separator according to one or more embodiments of the present invention.

The separator 17 in one or more embodiments of the present invention is formed in a heat-resistant insulating layer provided separator. In the separator 17, a heat-resistant insulating layer 172 is provided on one surface of a resin porous body or substrate 171 (see FIG. 3).

[Resin Porous Substrate]

The resin porous resin substrate 171 may be formed, for example, in a porous sheet containing an organic resin to absorb and hold electrolyte such as a conventional woven or non-woven sheet. The resin porous substrate is not particularly limited. As an example, the porous sheet may be formed, for example, in a microporous membrane composed of polymer microporous. Such polymers may be, for example, a polyolefin monolayer film such as polyethylene (PE), polypropylene (PP), these multilayer films, polyimide, and aramide and the like. Particularly, polyolefin microporous film has a property that is chemically stable with respect to organic solvents, and are thus employed in one or more embodiments of the present invention, since it is possible to suppress the reactivity with the electrolytic solution.

The thickness of the porous sheet cannot be uniquely defined since it is from different according to the application areas. However, in applications of the secondary battery for driving an electric motor for a vehicle, it is desirable to use a single layer or a multilayer with a thickness range between 4 and 35 µm. The pore diameter of the porous sheet is at most 1 µm or less (typically, a pore size of about tens nm) according to one or more embodiments of the present invention, and the porosity is 20 to 80% according to one or more embodiments of the present invention.

As the woven or nonwoven fabric, for example, polyesters such as polyethylene terephthalate (PET); polyolefin such as PP, and PE; polyimide, aramid and the like may be used. The bulk density of the woven or nonwoven fabric is not particularly limited as long as sufficient battery characteristics can be obtained by the electrolytic solution impregnated. According to one or more embodiments of the present invention, the porosity of woven or nonwoven fabric ranges between 50 and 90%. Further, according to one or more embodiments of the present invention, the thickness of the woven or nonwoven fabric ranges between 5 and 35 µm. According to one or more embodiments of the present invention, 5 µm or more thickness is employed because of superior retention of the electrolyte with excessive increase in resistance avoided.

(Heat-Resistant Insulating Layer)

Known oxide particles conventionally used is used for the heat-resistant insulating layer 172, and thus is not particularly limited. For example, as the material of the oxide particles, such material with melting or thermal softening point of 0.99° C. or higher, and according to one or more embodiments of the present invention, a high heat resistance of 240° C. or higher may be used. By using the material having with such high heat resistance, it is possible to effectively prevent shrinkage due to heat on the separator 17.

The oxide particles possess an electrically insulating property, stable to the solvent used in the preparation of the electrolyte solution and heat insulating layer 172. Further, according to one or more embodiments of the present invention, the oxide particles are electrochemically stable in the range of the battery operation voltage so as not easily susceptible to redox reaction.

According to one or more embodiments of the present invention, such oxide particles are inorganic particles in view of stability. Further, according to one or more embodiments of the present invention, the oxide particles is microparticles in view of disposability, and the secondary particle diameter may be for example in the range between 100 nm and 4 µm, and according to one or more embodiments of the present invention, is in the range between 300 nm and 3 µm, and according to one or more embodiments of the present invention, between 500 nm and 3 µm.

The shape of oxide particles is not particularly limited and may comprise a shape close to a spherical shape, a plate shape, a rod shape, or may be of a needle-like form.

The inorganic particles (inorganic powder) with melting point or thermal softening point at 0.99° C. or more, is not particularly limited. However, for example, inorganic oxides such as iron oxide (FeO), $SiO_2$, $Al_2O_3$, aluminosilicates (aluminosilicate), $TiO_2$, $BaTiO_2$, $ZrO_2$; inorganic nitrides such as such as aluminum nitride, silicon nitride; poorly soluble ionic crystals such as calcium fluoride, barium fluoride, barium sulfate; covalent crystal such as silicon, diamond; clays such as montmorillonite, and other particles may be listed. Inorganic oxides may be also mineral resource-derived substances or these artificial materials such as boehmite, zeolite, apatite, kaoline, mullite, spinel, olivine, mica. Further, inorganic particles may be formed by covering a surface of conductive material such as metal; conductive oxide such as SnO2, tin-indium oxide (ITO); carbonaceous materials such as carbon black, graphite; with electrically insulating material such as the inorganic oxides described above so as to impart electrical insulation. Among them, since particles of the inorganic oxide can easily be applied onto the resin porous body 171 as a water dispersed slurry, it is possible to produce a separator 17 in a simple method, according to one or more embodiments of the present invention. Among the inorganic oxides, $Al_2O_3$, $SiO_2$, and aluminosilicates (aluminosilicate) are employed according to one or more embodiments of the present invention.

Note that the heat-resistant particles as described above may f be used one kind alone or may be used in combination of two or more.

The thickness of the heat-resistant insulation layer 172 appropriately determined depending on the battery type and application so that no particular limitation is posed. However, for example, a heat-resistant insulating layer provided separator with a heat-resistant insulating layer 172 may have a total thickness of the entire separator in the range of about 10 to 35 μm according to one or more embodiments of the present invention. With such a thickness, the retention of the electrolyte in the resin porous body 171 portion is maintained good, and increase in resistance can be suppressed.

(Shape of the Heat-Resistant Insulating Layer Provided Separator)

Figure 3:
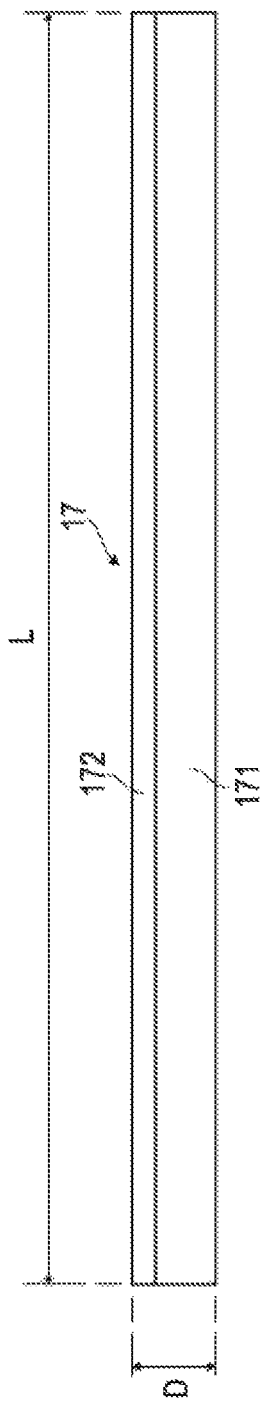
FIG. 3 is a schematic side view for explaining the shape of the planar state of the heat-insulating layer provided separator.
Figure 4:
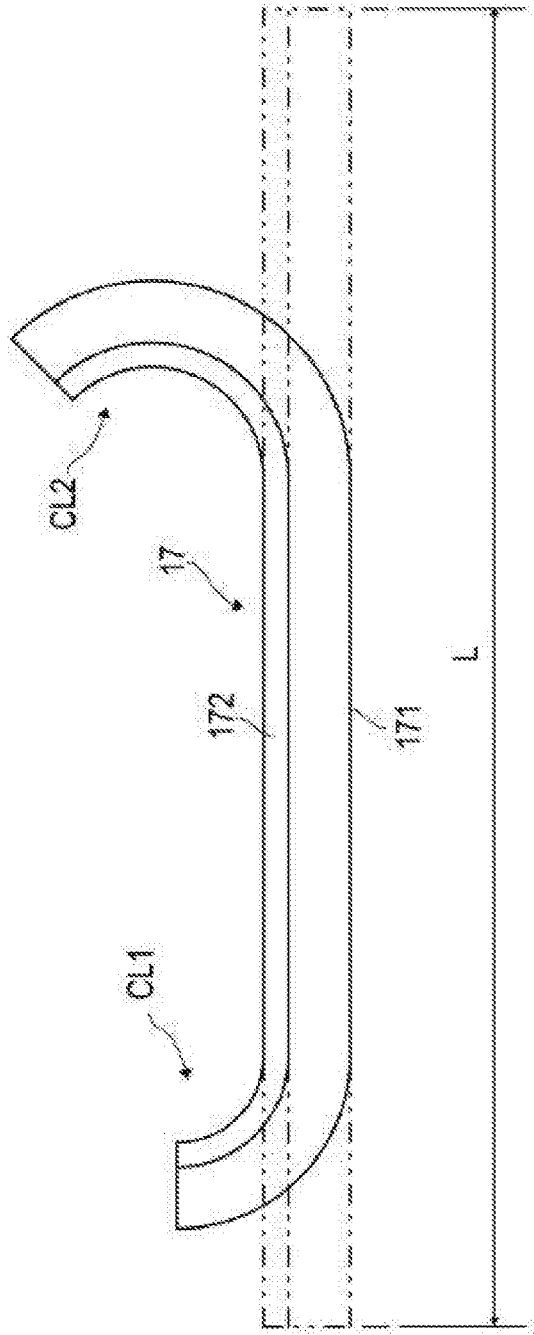
FIG. 4 is a schematic side view for explaining the shape of the curl state of the heat-resistant insulating layer provided separator.

A description will now be given of the shape of the heat-resistant insulating layer provided separator. FIG. 3 is a schematic side view for explaining the shape of the planar state of the heat-insulating layer provided separator. FIG. 4 is a schematic side view for explaining the shape of the curl state of the heat-resistant insulating layer provided separator FIG. 4 is thus a schematic side view from the direction in which a curl is visible in the state where curling occurs.

The separator 17 is provided with a heat-resistant insulating layer 172 on one surface of the resin porous body 171. The separator 17 has, as shown in FIG. 3, in a planar state, length of L at one side of the separator 17, thickness of D, respectively. However, the length L at the one side of the separator 17 is measured in the direction of curling, for example, and represents a short side of the rectangular separator 17. Of course, due to the environment in the production step, if the long side is more easily curled, the length of the long side direction referred to as L.

The separator 17 is shaped in rectangular and sized such that the length of at least one side is 100 mm or more (The thickness is defined as previously described). The size of the separator 17 is defined in relation to the size of the electrode. For example, when the aspect ratio of the electrode, defined as the aspect ratio of a positive electrode active material layer, may range from 1 to 3, the aspect ratio of the separator 17 is sized accordingly.

Now, a description is made of a state where curling occurs in the separator 17.

In FIG. 4, a state is shown in which curls CL1 and CL2 occur to the separator 17. In FIG. 4, in phantom line (two-dot chain line), a flat state before curling is shown (state of FIG. 3). As illustrated, the curls CL1 and CL2 occur at the end of the separator 17. The possible cause of occurrence of such curling is due to drying process. More specifically, in a nonaqueous electrolyte system, with too much moisture, the expected performance cannot be sufficiently exhibited. Thus, it is necessary to dry the separator to remove moisture. Therefore, the separators 17 in stock will be laminated after removing the moisture by drying.

During the drying step, between a porous resin body or substrate 171 of the separator 17 and a heat-resistant insulating layer 172 formed on one surface thereof, the degrees of shrinkage or contraction is different from each other. This is because the materials of the resin porous substrate 171 and the heat-resistant insulating layer 172 are different. Carl is generated due to the difference in the degree of contraction. In one or more embodiments of the present invention, the shrinkage is reduced so as to leave a water content within a predetermined range in the separator 17 in the drying step.

According to one or more embodiments of the present invention, the range of curl amount may be defined by a length ratio Y after shrinkage representing a ratio of shrinkage of the resin porous substrate 171 and that of the heat-resistant insulating layer 172. According to one or more embodiments of the present invention, the range of the length ratio after shrinkage is configured such that the separator 17 is shaped to satisfy the equation (1) described below. Therefore, in the drying step, the curl amount is controlled so as to be in the range defined in the equation (1).

$$1-4\pi X \leq Y \leq 1+4\pi X \qquad (1)$$

in equation (1), X represents a ratio of the thickness D of the entire separator 17 in a plane state (in which no curl occurs) to the length L in the direction of the curl occurrence, i.e., X=D/L.

Thus, by maintaining the length ratio Y after shrinkage to satisfy equation (1), fold or crease would not occur even with some curling occurring. Thus, it is possible to improve the yield of the lamination step.

Figure 5:
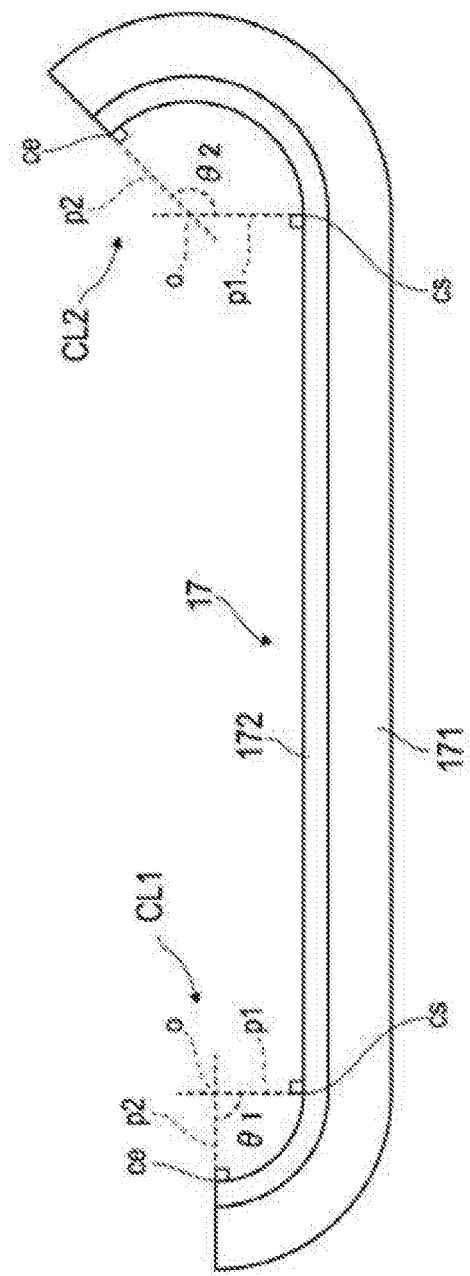
FIG. 5 is a diagram illustrating a method for obtaining arc central angle of the curl and the length ratio Y after shrinkage.

Now, a description is given of the method to obtain the length ratio Y after shrinkage. FIG. 5 is a diagram illustrating a method for obtaining the arc central angle of the curl and the length ratio Y after shrinkage Length ratio Y after shrinkage represents a ratio shrinkage of the resin porous substrate 171 and the heat-resistant insulating layer 172. In other words, the length ratio is defined as the ratio of the amount of shrinkage of the resin porous body 171 due to drying to the amount of shrinkage of the heat-resistant insulation layer. Therefore, when these shrunken or contraction values are measurable, the ratio may be defined as the ratio Y after shrinkage.

However, since the resin porous body 171 is firmly adhered to the heat-resistant insulating layer 172, it is difficult to measure each shrinkage amount separately.

Therefore, the ratio Y after shrinkage is determined to be obtained from the central angel of the arc of the curl generated caused by shrinkage of the separator.

In order to determine the length ratio Y after shrinkage, when viewed from the direction in which curls are visible, respective central angles θ1 and θ2 of the arc of curls CL1 and CL2 are first obtained, which occur at both ends.

Then a perpendicular line p is drawn for the separator plane from the origin cs part of the curl of the separator 17. Another perpendicular line p2 is drawn from curling endpoint ce (i.e. the end of the separator 17) with respect to the separator plane. The central angles θ1 and θ2 formed by and at the crossing point "o" of these perpendiculars p1 and p2 as the center of the arc are obtained.

Figure 6:
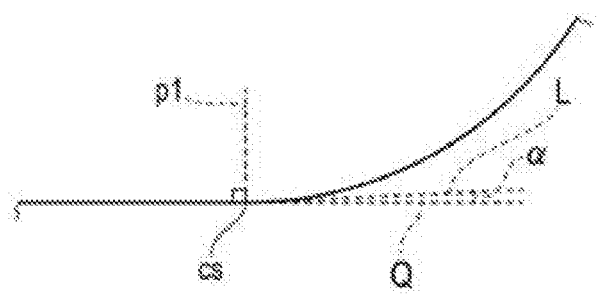
FIG. 6 is a schematic diagram for explaining the origin cs of the curl.

A description is given of the origin cs of curl. FIG. 6 is a schematic diagram for explaining the origin cs of curl.

The curl origin cs shows the position in which curl occurs. As shown in FIG. 6, by drawing lines L along the curl from an extension line (plane extension) Q of the separator plane and the position is obtained in which the angle α formed by the plane extension Q and the line L starts to assume about 1° to 2°.

The length ratio Y after shrinkage is calculated using the central angles θ1 and θ2 of the arc of the curl thus obtained according to the following equation (2).

$$Y = 1 - 2\pi((\theta1+\theta2)/360°)X \quad (2)$$

Figure 7:
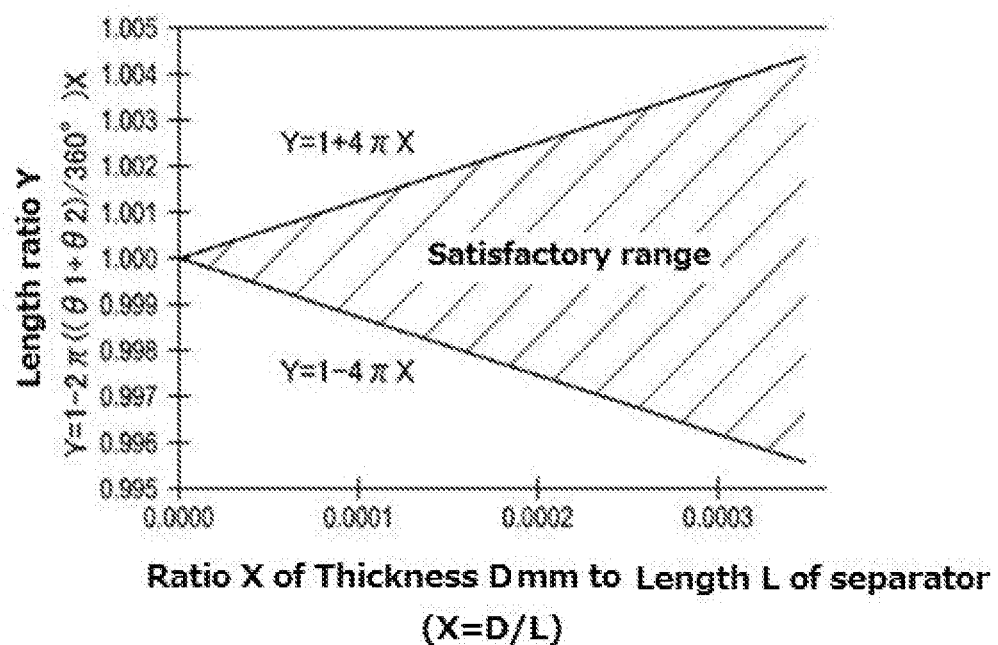
FIG. 7 is a graph showing the relationship between the length ratio Y after shrinkage and the ratio X of the thickness D to the length L of the separator.

FIG. 7 is a graph showing the relationship between the length ratio Y after shrinkage and the ratio X representative of the thickness D to the length L of the separator 17. In FIG. 7, the range satisfying the equation (1) is indicated.

In the drying step, control is executed so as to be maintained within a range between a line representing Y=1−4πX and line representing Y=1+4πX (indicated as "satisfactory range" in the figure).

In order to satisfy the length ratio Y after shrinkage as required in equation (1), the water content contained in the separator 17 is maintained in a predetermined range.

The water content to remain in the predetermined range in the drying step is controlled to satisfy the following equation (3) using the water content ratio W between water contents before and after the drying step.

$$0.4 \leq W < 1 \quad (3)$$

where the water content ratio W is calculated by the following equation (4) using a water content before drying w1 and a water content after drying w2:

$$W = w2/w1 \quad (4)$$

Now, description is made of the reason why the water content that can suppress curling of the separator 17 may be indicated by the water content ratio. Water contained in the separator 17 varies depending upon a production process of the separator 17 and temperature and humidity of a place in which the product has been stored. On the other hand, in the production process of the laminated battery, the separator 17 will be dried so that the maximum value of the water content of the separator 17 reaches a specific range. Whether or not the separator 17 will be curled is dependent not from the absolute water content before and after drying, but rather dependent on the water content that has been decreased. Thus, the water content ratio is used as controlling parameter as the water content that can suppress curl of the separator 17 from occurring, according to one or more embodiments of the present invention.

Regarding the maximum value of the water content after drying w2 (absolute value), because of the use of non-aqueous electrolyte, 950 ppm is set as the upper limit of the water content of the entire heat-resistant insulated layer provided separator. This is because, if too much moisture is present in the separator 17, it is possible that the water content remains in the battery after production of the battery (after sealing). Due to reaction of water with electrolyte solution and through electrolysis, gas is generated. The gas component leads to decrease in battery performance by blocking to form electrode coating during the initial charging. If about 950 ppm is available as the maximum value of the water content of the separator 17, the situation does not lead to the performance degradation. In one or more embodiments of the present invention, a target value of 950 ppm is set during the drying step. That is, the separator will be dried so that the water content is equal to or less than this target value (although water content of the predetermined range should remain).

Note that the lower limit of the water content of the separator 17 is not particularly limited. Thus, as described above, occurrence of curl is prevented by satisfying equation (3) described above.

The degree or extent of curl also depends on the moisture or water content decrease rate in the drying step. In order to suppress the occurrence of curl, the water decrease rate is defined as ((1−W)/T), which according to one or more embodiments of the present invention, satisfies the following equation (5).

$$(1-W)/T \leq 1.2 \quad (5)$$

where, W is the water content ratio. T is the time 0.5 hr.

The water decrease rate is calculated by measuring at certain time intervals the water content of the separator 17 and using the above equations (4) and (5). Regarding the time intervals, the water content w1 is measured before starting drying, and after elapse of first 0.5 hours after starting of the drying (30 minutes) (T=0.5 hr.), the water content w2 after drying is measured. Although the drying step is carried out to reach the target value, water falls out substantially at early time after the start of drying. Thus, the water decrease rate is to be determined by the water content of the first 30 minutes. The water decrease rate is related to the occurrence of curling in the initial drying step during which water is most prone to escape.

As described above, by satisfying the above equation (1) by the shape of the separator 17, and by controlling the water content so as to satisfy at least one of equations (3) and (5), it is possible to suppress occurrence of curling of the heat-resistant insulating layer provided separator 17. Thus, in the production of the laminated battery using the heat-resistant insulating layer provided separator 17, it is possible to suppress fold due to curled end. to thereby improve the yield.

[Method for Production of a Laminated Battery]

Now a description is given of a production method of a laminated or stacked battery.

Figure 8:
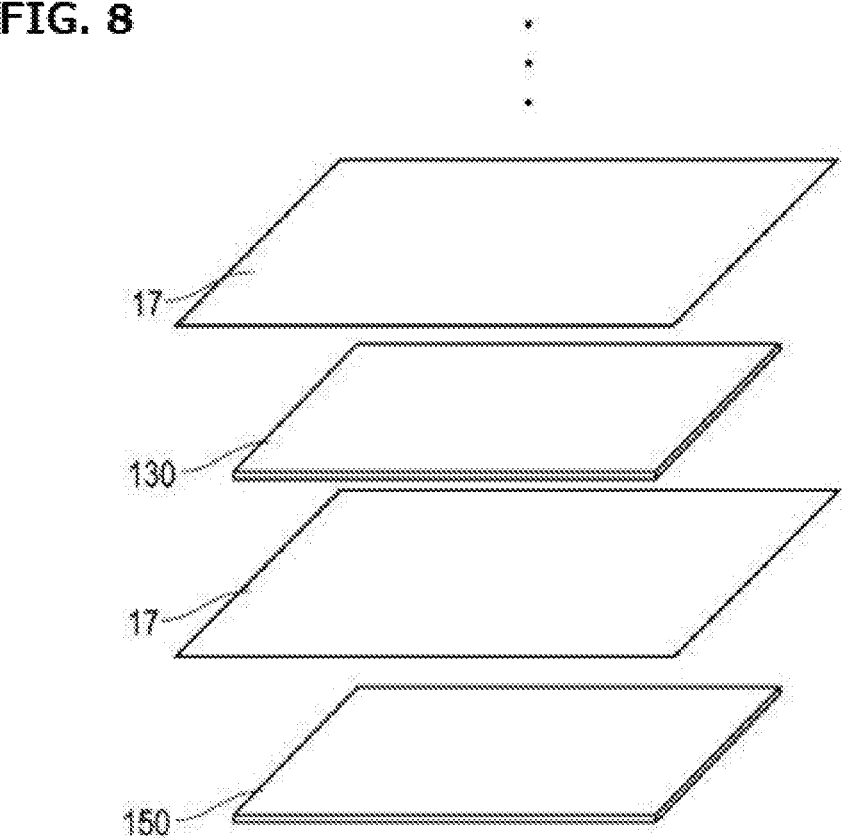
FIG. 8 is a schematic exploded perspective view for explaining a producing method of a laminated battery.

FIG. 8 is a schematic exploded perspective view for explaining a production method of a laminated battery In the figure, details such as the current collector, the active material, leads, and the external package are omitted.

As shown in FIG. 8, in the laminated battery, a positive electrode 150 that is formed into a sheet, a separator 17, and a negative electrode 130 are laminated or stacked in this order. At this time, when if curl has occurred in the separator 17, the end of the separator 17 warped by curling will be pressed down by the negative electrode 130 (or positive electrode 150) laminated thereon.

Subsequently, when completed as a battery stack, the laminated state occurs such that the ends of the separator 17 are laminated in folded state.

Examples

Now a description is given of the examples of one or more embodiments of the present invention, and a comparative example.

(Sample Preparation)

By applying a slurry using alumina as heat-resistant particles on one side of the PP substrate and subsequently drying in hot air, a heat-resistant insulating layer was formed. While formed in a roll form with a width of 200 mm, a separator was prepared with the heat-resistant insulating layer on one side thereof. The thickness D of the heat-resistant insulating layer provided separator was measured by a thickness measuring instrument.

The conditions and experimental results of the Examples and Comparative Examples are shown in Tables 1 and 2 below.

Each of Examples and Comparative Examples was cut into the same size (square shape with the length at one side L=200 mm).

(Drying Step)

A drying step was carried out for each of Examples and Comparative Examples while controlling the environmental temperature and humidity with different dew point temperatures. Example 1 is conditioned to the highest dew point (highest humidity), and the dew point is progressively lowered in the order of Examples 2, 3, and Comparative Example 2.

Note that Comparative Example 1 did not undergo a drying step. Respective dew points representing the drying condition are shown in Table 1.

(Measurement of Water Content)

The water contents were measured once before a drying step, and at several times in 30-minute intervals after drying-start until elapse of 8 hours. The water decrease rate was obtained based on the water contents at each elapsed time.

Sample collection: A plurality of sheets for each of Examples and Comparative Examples of the heat-resistant insulating layer provided separator (sized 200×200 mm) that were prepared according to the sample preparation procedure. Among Examples and Comparative Examples, a single sheet was intended for water content measurement, and the rest was used in the evaluation of laminate property and battery performance. In order to measure the water content before drying, a sheet of heat-resistant insulating layer provided separator for water content measurement was cut into a sample with the width of about 0.5 cm and the length of about 2.5 cm. The water content before drying was specifically measured by the following measuring method. After starting to dry, the sheet of the heat-resistant insulating layer provided separator was cut into samples (about 0.5 cm width×about 2.5 cm length). The water content was thus measured at 30 minute intervals until 8 hours after the start of drying.

Measuring method: Measurement of water content was carried out by the coulemetric titration method, using the Karl Fischer method. More specifically, measurement was made by using CA-200 Karl Fischer moisture meter (manufactured by Mitsubishi Chemical Analytic Tec), a water vaporizer VA-236S (manufactured by Mitsubishi Chemical analytic Tech), and Aquamicron™ AX, Aquamicron® CXU as reagent, respectively.

First, the heating temperature of the water vaporizer was set to a target temperature 120° C. After reaching the target temperature, the water vaporizer was purged using dry nitrogen as a carrier gas. Exact weight of the sample for water content measurement described above was measured. Subsequently, the sample is stuffed in a vial bottle and capped. Thereafter, the vial bottle was set in the water vaporizer and heated for water content measurement of the sample.

(Experimental Results)

Confirmation of the Length Ratio after Shrinkage:

Each heat-resistant insulating layer provided separator after drying (200×200 mm×thickness D) of Examples and Comparative Examples was placed with the heat-resistant layer side up. A charge eliminating brush was discharged for static elimination twice and placed for 24 hours. The length ratio Y was obtained of the heat-resistant insulating layer provided separator after shrinkage. When calculating the length ratio Y after shrinkage, the separator was photographed from the direction of the side surface in which the curled state is visible, and a ruler and a protractor were used to obtain the central angle θ of the curl from the captured image. The values of the length ratio Y after shrinkage are shown in Table 2.

Confirmation of Lamination Property:

By laminating or stacking a positive electrode with the heat-resistant layer facing the positive electrode side, a separator, and a negative electrode of each of Examples and Comparative Examples alternately in twenty layers to evaluate the occurrence of fold in the separator end. The lamination property is evaluated to be good when no fold took place, while evaluated to be poor when fold occurred. The results are shown in Table 2.

Confirmation of Battery Performance:

By attaching electrodes on each of the positive electrode and the negative electrode of the 20-layer-battery, encasing by laminating sealant, and sealing with electrolyte filled, a secondary battery was produced. Using each secondary battery one cycle of charge and another cycle of discharge was carried out. Subsequently, a capacity retention was obtained while carrying out 200 cycles of charge-discharge operation at 45° C. Compared with the capacity retention of Comparative Example 1 of which the retention is set to 1, the battery sample with greater than 1 is evaluated as good, the sample with 1 or less is evaluated as defective or poor. Note that, due to lamination failure of Comparative Example 2, a secondary battery could not be produced. Therefore, the charge-discharge operation was not performed. The results are shown in Table 2.

TABLE 1

| | Length L(mm) | Thickness D(mm) | Thickness/ Length (D/L) | Length ratio after shrinkage Y | Drying condition (dew point (° C.)) |
|---|---|---|---|---|---|
| Example 1 | 200 | 0.025 | 0.00013 | 0.9996 | −3 |
| Example 2 | 200 | 0.025 | 0.00013 | 0.9992 | −20 |
| Example 3 | 200 | 0.025 | 0.00013 | 0.9984 | −40 |
| Comparative Example 1 | 200 | 0.025 | 0.00013 | 1.0000 | — |
| Comparative Example 2 | 200 | 0.025 | 0.00013 | 0.9977 | −65 |

TABLE 2

| | Water content before drying w1(ppm) | Water content after drying w2(ppm) | Water content ratio W (w1/w2) | Water content decrease rate (1 − W)/T | Lamination property | Battery performance |
|---|---|---|---|---|---|---|
| Example 1 | 969 | 787 | 0.81 | 0.38 | good | good |
| Example 2 | 969 | 562 | 0.58 | 0.84 | good | good |
| Example 3 | 969 | 456 | 0.47 | 1.06 | good | good |
| Comparative Example 1 | 969 | — | 1.00 | — | good | defective |

TABLE 2-continued

|  | Water content before drying w1(ppm) | Water content after drying w2(ppm) | Water content ratio W (w1/w2) | Water content decrease rate (1 − W)/T | Lamination property | Battery performance |
|---|---|---|---|---|---|---|
| Comparative Example 2 | 969 | 312 | 0.32 | 1.36 | defective | N/A |

Figure 9:
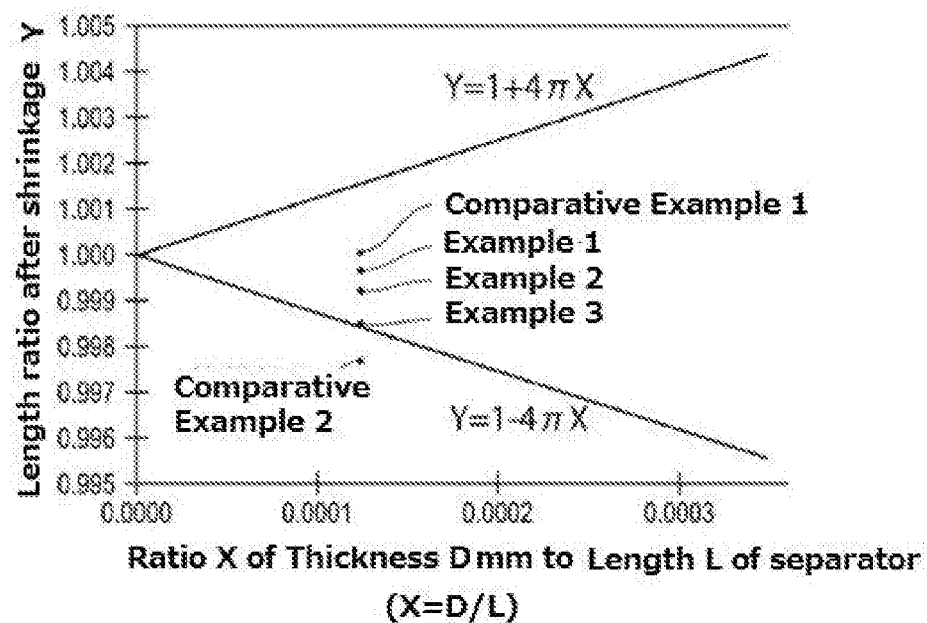
FIG. 9 is a graph showing the relationship between the length ratio Y after shrinkage and the ratio X representing a ratio of the thickness to the length of the separator with data of embodiments and Comparative Examples plotted.

FIG. 9 is a graph showing the relationship between the length ratio Y after shrinkage and the ratio X representing a ratio of the thickness to the length of the separator with data of embodiments and Comparative Examples plotted.

As shown, Examples 1, 2, 3 and Comparative Example 1 are plotted within a good range of the length ratio Y shown by equation (1). In other words, Y satisfying the equation:

$$1-4\pi X \leq Y \leq 1+4\pi X$$

By referring to the graph along with the results of lamination property and battery performance in Table 2, when the length ratio Y after shrinkage is within a satisfactory range required by equation (1), it can be seen that both the lamination property and the battery cell performance are good.

Figure 10:
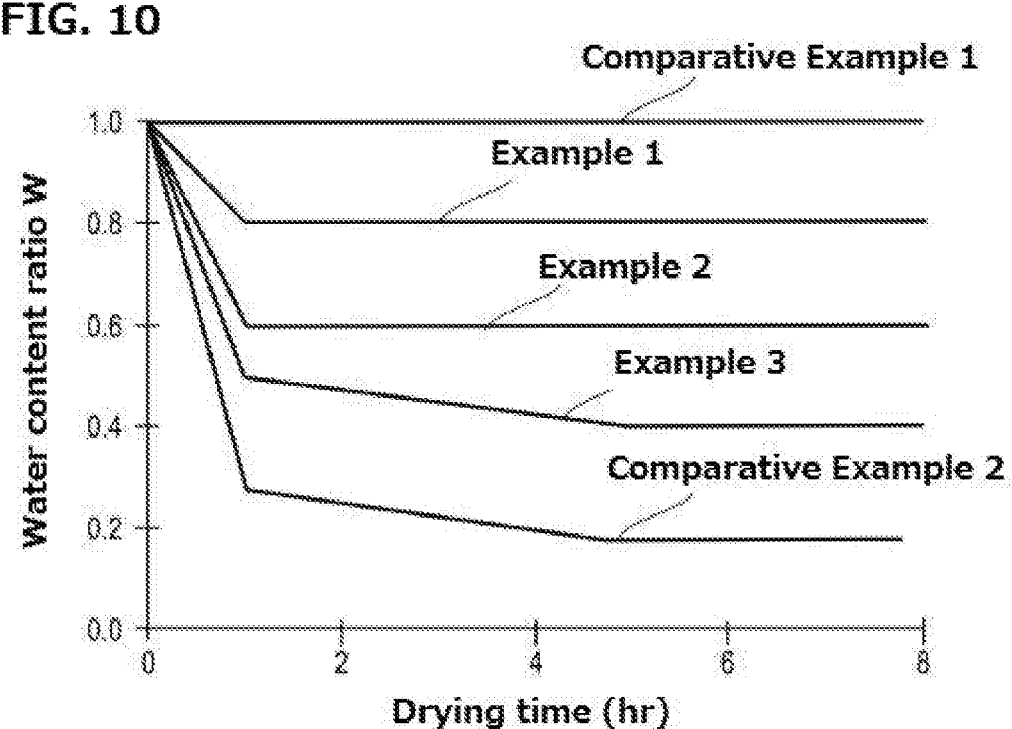
FIG. 10 is a graph showing the water content ratio W and the drying time T in Examples and Comparative Examples.

FIG. 10 is a graph showing the water content ratio W and the drying time T in Examples and Comparative Examples.

As shown, with respect to Examples 1, 2 and 3, in Comparative Example 2, the water content ratio W rapidly decreased when compared within the same time period. This indicates that the water decrease rate of Comparative Example 2 is faster than Examples 1, 2 and 3. Examples 1, 2 and 3 respectively satisfy the equation: $(1-W)/T \leq 1.2$. On the other hand, in Comparative Example 2, the value of $(1-W)/T$ exceeds 1.2. Note that, in Comparative Example 1, since the drying step was not performed, in the graph, the water content ratio W is depicted as 1.0 despite elapse of time.

From the above results, according to one or more embodiments of the present invention, the water content ratio W satisfies the equation: $0.4 \leq W < 1$, according to one or more embodiments of the present invention, satisfies: $0.47 \leq W \leq 0.81$. Further, the water decrease rate is found to be good when satisfying the equation: $(1-W)/T \leq 1.2$ (with T=0.5 hr), and according to one or more embodiments of the present invention, satisfies the equation: $(1-W)/T \leq 1.06$ (with T=0.5 hr).

Thus, as seen from the results of the lamination property and battery cell performance shown in the graph of FIG. 10 and Table 2, it is found that Examples 1, 2, and 3 in which the water content ratio W is within the range defined by equation (3) are good in both lamination or stacking properties and battery cell performance. Also, it is better to have a slower water content decrease rate. By satisfying equation (5), a good lamination property and battery performance may be obtained.

One or more embodiments of the present invention may have one or more of the following effects.

(1) In one or more embodiments of the present invention, the water content is set in a predetermined range instead of completely dry a heat-resistant insulating layer provided separator when drying the heat-resistant insulating layer provided separator. Thus, it is possible to suppress the occurrence of curling due to shrinkage of the heat-resistant insulating layer provided separator. Therefore the positive electrode, it is possible to improve the yield of the lithium ion secondary battery produced by laminating a positive electrode, the heat-resistant insulating layer provided separator, and a negative electrode.

(2) In one or more embodiments of the present invention, after a drying step, while defining Y as a length ratio of the resin porous substrate to the heat-resistant insulating layer after shrinkage, the equation (1) described above is configured to be satisfied. Thus, even curling occurs, by satisfying the equation (1) as the shape of the separator expressed in the length ratio after shrinkage, it is possible to prevent folding or crease in the end of the separator from occurring.

(3) In one or more embodiments of the present invention, while defining as a water decrease rate during the drying step $(1-W)/T$, the water decrease rate is configured to satisfy the equation (5). Thus, it is possible to prevent curling from occurring and allow the length ratio Y after shrinkage to satisfy equation (1).

(4) one or more embodiments of the present invention, in the drying step, as the predetermined range of the water content to be maintained when drying the heat-resistant insulating layer provided separator, a water content ratio $W=w2/w1$ is configured to satisfy equation (3) described above, where w1 denotes a water content before drying and w2 denotes a water content after drying. Thus, it is possible to prevent curling from occurring and allow the length ratio Y after shrinkage to satisfy equation (1).

(5) One or more embodiments of the present invention are suited for a secondary battery with a ratio of battery cell area to rated capacity being 5 $cm^2$/Ah or more, and the rated capacity less than 3 Ah.

As described above, a description has been given of embodiments and examples of the present invention. However, the present invention is not limited to the above embodiments and examples. Rather, various modifications are available, and the scope of the present invention is defined by the matter described in the appended claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

10 lithium ion secondary,
11 negative electrode current collector,
12 positive electrode current collector,
13 negative electrode active material layer,
15 positive electrode active material layer,
17 separator,
19 unit cell layer,
21 power generating element,
130 negative electrode,
150 positive electrode,
171 resin porous substrate,
172 heat-resistant insulating layer.

The invention claimed is:

1. A method for producing a lithium ion secondary battery in which a positive electrode, a heat-resistant insulating layer provided separator having a heat-resistant insulating layer formed of oxide particles on one surface of a resin porous substrate, and a negative electrode are laminated on one another, and a nonaqueous electrolyte is impregnated in the heat-resistant insulating layer provided separator, comprising:

drying the heat-resistant insulating layer provided separator before laminating so that a water content in the heat-resistant insulating layer provided separator remains in a predetermined range, wherein, in the drying, the water content in the heat-resistant insulating layer provided separator is decreased to the predetermined range by controlling a dew point and maintaining the predetermined range after reaching the predetermined range of the water content, and wherein, in the drying, the heat-resistant insulating layer provided separator is dried by setting the dew point so as to attain a water content decrease rate such that a shape of the heat-resistant insulating layer provided separator after the drying defined by a length ratio Y that is a ratio of a length of the resin porous substrate to a length of the heat-resistant insulating layer satisfies an equation:

$$1-4\pi X \leq Y \leq 1+4\pi X,$$

wherein D represents a thickness of the separator, L represents a length of the separator, and X represents a ratio (D/L) of the thickness D to the length L of the separator, wherein, in the drying, the water content is decreased such that a water decrease rate ((1−W)/T) satisfies an equation:

$$((1-W)/T) \leq 1.2, \text{ and}$$

wherein W is a water content ratio W=w2/w1, T is a drying time of 0.5 hour, w1 is a water content before starting the drying, and w2 is a water content that is measured when T elapses after starting the drying.

2. The method for producing a lithium ion secondary battery according to claim 1, wherein, in the drying step, the heat-resistant insulating layer provided separator is dried such that the water content to remain in the predetermined range is controlled to satisfy an equation:

$$0.4 \leq W < 1.$$

3. The method for producing a lithium ion secondary battery according to claim 1, wherein the lithium ion secondary battery comprises a ratio of a battery cell area to rated capacity is 5 cm$^2$/Ah or more, and the rated capacity is at least 3 Ah or more.

* * * * *